United States Patent
Onishi et al.

(10) Patent No.: US 11,447,662 B2
(45) Date of Patent: *Sep. 20, 2022

(54) OPTICAL TRANSPARENT ADHESIVE SHEET, METHOD FOR PRODUCING OPTICAL TRANSPARENT ADHESIVE SHEET, LAMINATED BODY, AND DISPLAY DEVICE WITH TOUCH PANEL

(71) Applicant: BANDO CHEMICAL INDUSTRIES, LTD., Hyogo (JP)

(72) Inventors: Jun Onishi, Hyogo (JP); Soichiro Nakane, Hyogo (JP); Yuki Hosokawa, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,629

(22) PCT Filed: Nov. 14, 2016

(86) PCT No.: PCT/JP2016/083674
§ 371 (c)(1),
(2) Date: May 24, 2018

(87) PCT Pub. No.: WO2017/090474
PCT Pub. Date: Jun. 1, 2017

(65) Prior Publication Data
US 2018/0354229 A1  Dec. 13, 2018

(30) Foreign Application Priority Data
Nov. 26, 2015 (JP) .............................. JP2015-231037

(51) Int. Cl.
*C09J 7/22* (2018.01)
*B32B 27/40* (2006.01)
(Continued)

(52) U.S. Cl.
CPC ................. *C09J 7/22* (2018.01); *B32B 27/00* (2013.01); *B32B 27/40* (2013.01); *C09J 7/10* (2018.01);
(Continued)

(58) Field of Classification Search
CPC . B32B 7/02; B32B 27/00; B32B 27/40; C09J 7/30; C09J 7/10; C09J 7/38;
(Continued)

(56) References Cited

U.S. PATENT DOCUMENTS 3,914,484 A * 10/1975 Creegan .................. C09J 7/21
428/41.5
4,025,579 A    5/1977 Gruber et al.
(Continued)

FOREIGN PATENT DOCUMENTS

CA    2696968    2/2009
CN    1037523    11/1989
(Continued)

OTHER PUBLICATIONS

Espacenet Translation of WO-2011158839-A1 (Year: 2019).*
(Continued)

*Primary Examiner* — Michael Zhang
(74) *Attorney, Agent, or Firm* — JCIPRNET

(57) ABSTRACT

The present invention provides an optically clear adhesive sheet with reduced delay bubble generation using a thermosetting polyurethane composition that has excellent flexibility and is capable of giving a thick film. The optically clear adhesive sheet of the present invention is an optically clear adhesive sheet formed of a cured product of a thermosetting polyurethane composition, the optically clear adhesive sheet having a shear storage modulus (G') at 85° C. of $4.5 \times 10^3$ to $5.0 \times 10^4$ Pa, a loss tangent (tan δ) at 85° C. of 0.3 to 0.97, and a thickness of 50 to 2000 μm. The optically clear adhesive
(Continued)

sheet preferably has an adhesive strength measured by a 180° peel test of 2 N/25 mm or more.

7 Claims, 2 Drawing Sheets

(51) Int. Cl.

| | |
|---|---|
| *C09J 175/08* | (2006.01) |
| *G02F 1/1333* | (2006.01) |
| *G06F 3/041* | (2006.01) |
| *G09F 9/00* | (2006.01) |
| *C09J 175/04* | (2006.01) |
| *B32B 27/00* | (2006.01) |
| *C09J 7/10* | (2018.01) |
| *C09J 7/30* | (2018.01) |
| *C09J 11/08* | (2006.01) |
| *C09J 7/38* | (2018.01) |

(52) U.S. Cl.
CPC . *C09J 7/30* (2018.01); *C09J 7/38* (2018.01); *C09J 11/08* (2013.01); *C09J 175/04* (2013.01); *C09J 175/08* (2013.01); *G02F 1/1333* (2013.01); *G06F 3/041* (2013.01); *G09F 9/00* (2013.01); *C09J 2203/318* (2013.01); *C09J 2475/00* (2013.01)

(58) Field of Classification Search
CPC ..... C09J 7/00; C09J 7/40; C09J 175/04; C09J 11/08; C09J 175/08; C09J 2203/318; C09J 2475/00; G09F 9/00; G06F 3/041; G02F 1/1333
See application file for complete search history.

(56) References Cited

U.S. PATENT DOCUMENTS

| | | | |
|---|---|---|---|
| 4,705,721 A | 11/1987 | Frisch et al. | |
| 5,252,155 A | 10/1993 | Nowicki et al. | |
| 5,486,570 A * | 1/1996 | St. Clair | C08G 18/2815 |
| | | | 525/123 |
| 5,646,229 A | 7/1997 | Kudo | |
| 7,070,862 B1 | 7/2006 | Miyakawa et al. | |
| 2006/0022309 A1* | 2/2006 | Tokunaga | C08J 7/047 |
| | | | 257/632 |
| 2008/0280074 A1 | 11/2008 | Sugino et al. | |
| 2010/0040842 A1 | 2/2010 | Everaerts et al. | |
| 2010/0216905 A1 | 8/2010 | Kuwamura et al. | |
| 2011/0003146 A1 | 1/2011 | Qiu et al. | |
| 2012/0000603 A1 | 1/2012 | Karafilidis et al. | |
| 2013/0115405 A1 | 5/2013 | Kinzelmann et al. | |
| 2014/0017467 A1 | 1/2014 | Inao et al. | |
| 2014/0329927 A1 | 11/2014 | Ha et al. | |
| 2018/0112112 A1* | 4/2018 | Onishi | C09J 7/00 |
| 2018/0112122 A1 | 4/2018 | Phan et al. | |
| 2018/0282586 A1* | 10/2018 | Hosokawa | C08G 18/246 |
| 2018/0354229 A1 | 12/2018 | Onishi et al. | |
| 2019/0039363 A1 | 2/2019 | Nakane et al. | |
| 2019/0048234 A1 | 2/2019 | Nakane et al. | |
| 2019/0194498 A1 | 6/2019 | Takagi et al. | |

FOREIGN PATENT DOCUMENTS

| | | | |
|---|---|---|---|
| CN | 1726250 | 1/2006 | |
| CN | 101784593 | 7/2010 | |
| CN | 103314068 | 9/2013 | |
| CN | 104093800 | 10/2014 | |
| CN | 108292178 | 7/2018 | |
| EP | 1864655 | 12/2007 | |
| EP | 3296373 | 3/2018 | |
| EP | 3357985 | 8/2018 | |
| EP | 3382517 | 10/2018 | |
| EP | 3412740 | 12/2018 | |
| JP | 09-183963 | 7/1997 | |
| JP | H11263961 | 9/1999 | |
| JP | 2011074333 | 4/2011 | |
| JP | 2012-021104 | 2/2012 | |
| JP | 2012121978 | 6/2012 | |
| JP | 2013018856 A * | 1/2013 | |
| JP | 2013018871 | 1/2013 | |
| JP | 2013116942 | 6/2013 | |
| JP | 2013-136731 | 7/2013 | |
| JP | 2013136731 A * | 7/2013 | |
| JP | 2013-213159 | 10/2013 | |
| JP | 2013212694 A * | 10/2013 | .......... C08F 290/067 |
| JP | 2014-148078 | 8/2014 | |
| JP | 2014-148081 | 8/2014 | |
| JP | 2014-152198 | 8/2014 | |
| JP | 2014148078 | 8/2014 | |
| JP | 2014148081 | 8/2014 | |
| JP | 2014196442 | 10/2014 | |
| JP | 2015-030766 | 2/2015 | |
| JP | 2015040240 | 3/2015 | |
| JP | 2015-083381 | 4/2015 | |
| JP | 2015083381 | 4/2015 | |
| JP | 2015120819 | 7/2015 | |
| JP | 2015-160905 | 9/2015 | |
| JP | 2015160905 | 9/2015 | |
| JP | 2015-189852 | 11/2015 | |
| JP | 2015-208898 | 11/2015 | |
| JP | 2015-209538 | 11/2015 | |
| JP | 2015189852 | 11/2015 | |
| JP | 2015208898 | 11/2015 | |
| JP | 2015209538 | 11/2015 | |
| JP | 2016141687 | 8/2016 | |
| JP | 2016141688 | 8/2016 | |
| JP | 5987135 | 9/2016 | |
| JP | 2017-008193 | 1/2017 | |
| JP | WO2014142192 A * | 2/2017 | |
| KR | 20070110433 | 11/2007 | |
| KR | 1020140029254 | 3/2014 | |
| NL | 7511615 | 4/1976 | |
| TW | 200927779 | 7/2009 | |
| WO | 2004052970 | 6/2004 | |
| WO | WO-2011158839 A1 * | 12/2011 | .......... C08F 290/067 |
| WO | 2012132520 | 10/2012 | |
| WO | 2013088889 | 6/2013 | |
| WO | 2013115250 | 8/2013 | |
| WO | 2013161812 | 10/2013 | |
| WO | WO-2014142192 A1 * | 9/2014 | ............... C09J 7/29 |
| WO | 2015016106 | 2/2015 | |
| WO | 2015190558 | 12/2015 | |
| WO | 2016181857 | 11/2016 | |

OTHER PUBLICATIONS

Espacenet Translation of JP-2013018856-A (Year: 2019).*
Human Translation of JP-2013018856-A (Year: 2019).*
Espacenet Translation of JP2013136731 (Year: 2019).*
Espacenet Translation of JP-2013212694-A (Year: 2019).*
Espacenet Translation of JPWO2014142192A (Year: 2019).*
"International Search Report (Form PCT/ISA/210)" of PCT/JP2016/083674, dated Dec. 20, 2016, with English translation thereof, pp. 1-4.
"Decision on Opposition of Japan Counterpart Application", dated Oct. 8, 2019, with partial English translation thereof, p. 1-p. 39.
"Notification of Reasons for Revocation of Japan Counterpart Application," with English translation, dated Apr. 25, 2019, p. 1-p. 20.
"Response to Notification of Reasons for Revocation of Japan Counterpart Application," with partial English translation, filed on Jun. 20, 2019, p. 1-p. 23.
"International Search Report (Form PCT/ISA/210) of PCT/JP2017/029447," dated Oct. 24, 2017, with English translation thereof, pp. 1-3.
"Notification of Reasons for Refusal of Japan Counterpart Application," dated Nov. 14, 2017, with English translation thereof, p. 1-p. 4.

(56) References Cited

OTHER PUBLICATIONS

"International Search Report (Form PCT/ISA/210) of PCT/JP2017/001680", dated Mar. 14, 2017, with English translation thereof, pp. 1-4.

"International Search Report (Form PCT/ISA/210)of PCT/JP2017/001701", dated Mar. 7, 2017, with English translation thereof, pp. 1-6.

"International Search Report (Form PCT/ISA/210)" of PCT/JP2016/078213, dated Oct. 25, 2016, with English translation thereof, pp. 1-4.

"International Search Report (Form PCT/ISA/210) of PCT/JP2016/063355," dated Jul. 12, 2016, with English translation thereof, pp. 1-4.

\* cited by examiner

OPTICAL TRANSPARENT ADHESIVE SHEET, METHOD FOR PRODUCING OPTICAL TRANSPARENT ADHESIVE SHEET, LAMINATED BODY, AND DISPLAY DEVICE WITH TOUCH PANEL

CROSS-REFERENCE TO RELATED APPLICATION

This application is a 371 application of International PCT application serial no. PCT/JP2016/083674, filed on Nov. 14, 2016, which claims the priority benefit of Japan application no. 2015-231037, filed on Nov. 26, 2015. The entirety of each of the abovementioned patent applications is hereby incorporated by reference herein and made a part of this specification.

TECHNICAL FIELD

The present invention relates to optically clear adhesive sheets, methods for producing an optically clear adhesive sheet, laminates, and display devices with a touchscreen.

BACKGROUND ART

Optically clear adhesive (OCA) sheets are transparent adhesive sheets used to bond optical members to each other. A recent rapid increase in demand for touchscreens in the fields of smartphones, tablet PCs, handheld game consoles, and automotive navigation systems is accompanied by an increase in demand for OCA sheets used to bond a touchscreen to another optical member. A typical display device with a touchscreen has a structure in which optical members including a display panel (e.g., liquid crystal panel), a transparent member (touchscreen main unit) having on its outer surface a transparent conductive film formed of a material such as indium tin oxide (ITO), and a cover panel that protects the transparent conductive film are stacked, with OCA sheets used to bond these optical members to each other. In between the display panel and the touchscreen main unit, however, is typically an air layer called an air gap but no OCA sheet because there is a gap larger than gaps between the other optical members due to the edge of a bezel, which is the housing of the display panel.

Known OCA sheets include those formed of an acrylic resin composition, for example. Patent Literature 1, for example, discloses an adhesive sheet that contains an adhesive formed of an adhesive composition containing a (meth) acrylic copolymer A with a weight average molecular weight of more than 50000 but 600000 or less and a (meth)acrylic copolymer B with a weight average molecular weight of 1000 or more but 50000 or less, wherein the adhesive has a dynamic shear loss tangent tan δ that is calculated from measured dynamic shear storage modulus G' and dynamic shear loss modulus G" values and satisfies the following formula (1) and the following formula (2).

$$\text{Tan } \delta(20° \text{ C. to } 150° \text{ C.}) \geq 0.5 \quad (1)$$

$$\text{Tan } \delta(1 \text{ Hz to } 10^{-5} \text{ Hz}) \geq 0.5 \quad (2)$$

In the formula (1), tan δ (20° C. to 150° C.) is the dynamic shear loss tangent of the adhesive at a temperature falling within the range of 20° C. to 150° C. and a frequency of 1 Hz. In the formula (2), tan δ (1 Hz to $10^{-5}$ Hz) is the dynamic shear loss tangent of the adhesive at a frequency falling within the range of 1 Hz to $10^{-5}$ Hz and a temperature of 20° C.

In OCA sheets formed of acrylic resin, acrylic acid remaining in the acrylic resin or acid components generated through hydrolysis may unfortunately corrode metals used in optical members. In addition, in the case where the acrylic resin composition is a UV-curing resin composition, a thick OCA sheet may be difficult to obtain because free radicals in the acrylic resin, which are necessary in the curing reaction, may be consumed in the outer layer part under UV light, leaving the bottom part uncured.

OCA sheets formed of a silicone-based resin composition are also known. However, OCA sheets formed of silicone resin have low adhesive strength and thus unfortunately allow air to enter a gap between optical members. This may cause problems such as deterioration of the display screen visibility.

Patent Literature 2 discloses a technique to deal with these problems, which is to use a polyurethane resin-forming composition containing a modified polyisocyanate and a polyol containing a liquid polycarbonate diol, for OCA sheets.

Also, Patent Literature 3 discloses a pressure-sensitive adhesive sheet comprising a pressure sensitive adhesive layer on at least one surface of a base material, wherein the pressure sensitive adhesive layer is made of a two-layer structure of a first pressure sensitive adhesive layer and a second pressure sensitive adhesive layer in this order from a side of the base material; a first pressure sensitive adhesive constituting the first pressure sensitive adhesive layer has a loss tangent (tan δ) value at 0° C. of 0.25 or more and a storage elastic modulus value at 0° C. of from 0.01 to 0.80 MPa; and a resin component in a second pressure sensitive adhesive constituting the second pressure sensitive adhesive layer comprises of from 10 to 100% by mass of an acrylic copolymer having a crosslinkable functional group. The pressure-sensitive adhesive sheet disclosed in Patent Literature 3 is intended to be used to reduce the thickness of the pressure-sensitive adhesive layer, particularly to reduce the thickness of the pressure-sensitive adhesive layer to 5.0 μm or less.

CITATION LIST

Patent Literature

Patent Literature 1: JP 2014-152198 A
Patent Literature 2: JP 2013-136731 A
Patent Literature 3: WO 2012/132520

SUMMARY OF INVENTION

Technical Problem

An air gap, which is an air layer, formed between optical members causes interfacial reflection because there are differences in refractive index between the air layer and the optical members. Such interfacial reflection deteriorates visibility of the display panel. This disadvantage has led to a demand for a thick OCA sheet suited to bonding of a display panel and a touchscreen main unit. Also, an OCA sheet used to bond a display panel and a touchscreen main unit is required to conform to an uneven surface on which the thick bezel is present. Accordingly, an OCA sheet has been desired which exhibits excellent flexibility (capability to conform to uneven surfaces) and can be made thick.

In studies to solve those problems, the inventors have focused on a solvent-free thermosetting polyurethane composition as a material of an OCA sheet that exhibits excellent flexibility and can be made thick. OCA sheets formed of a thermosetting polyurethane composition, however, have been found to exhibit adhesive performance which can still be improved. In other words, in a delay bubble test in which an OCA sheet is bonded to a glass plate covered with powder and the workpiece is left to stand at a high temperature (85° C.) to check whether or not air bubbles are generated from the powder at the interface between the sheet and the plate, air bubbles were found to be generated due to the powder (hereinafter, such air bubbles are also referred to as "delay bubbles"). Yet, design guidelines to reduce such delay bubble generation were unfortunately unknown.

The present invention has been made in view of the above current state of the art, and aims to provide an optically clear adhesive sheet with reduced delay bubble generation using a thermosetting polyurethane composition that has excellent flexibility and is capable of giving a thick film.

Solution to Problem

The inventors have made studies on optically clear adhesive sheets formed of a thermosetting polyurethane composition. The studies have revealed that delay bubble generation can be reduced by controlling the shear storage modulus (G') at 85° C. and the loss tangent (tan δ) at 85° C. to the respective specific ranges. Thereby, the inventors have completed the present invention.

The optically clear adhesive sheet of the present invention is an optically clear adhesive sheet formed of a cured product of a thermosetting polyurethane composition, the optically clear adhesive sheet having a shear storage modulus (G') at 85° C. of $4.5 \times 10^3$ to $5.0 \times 10^4$ Pa, a loss tangent (tan δ) at 85° C. of 0.3 to 0.97, and a thickness of 50 to 2000 μm.

The optically clear adhesive sheet of the present invention preferably has an adhesive strength measured by a 180° peel test of 2 N/25 mm or more.

The thermosetting polyurethane composition preferably contains a polyol component, a polyisocyanate component, and a tackifier. The polyol component preferably has an olefin skeleton. The polyisocyanate component is preferably a modified polyisocyanate that is obtained by reacting an acyclic aliphatic and/or alicyclic polyisocyanate containing an isocyanate group with an ether compound containing an ethylene oxide unit. The tackifier preferably contains at least one of an alicyclic saturated hydrocarbon resin and a hydrogenated petroleum resin obtained by hydrogenating a copolymer of dicyclopentadiene and an aromatic compound.

The thermosetting polyurethane composition preferably further contains a plasticizer. The plasticizer preferably contains a carboxylic acid-based plasticizer.

The thermosetting polyurethane composition preferably has an α ratio, which is the number of moles of OH groups derived from the polyol component/the number of moles of NCO groups derived from the polyisocyanate component, of 1.6 to 1.96.

The method for producing an optically clear adhesive sheet according to the present invention is a method for producing the optically clear adhesive sheet of the present invention, the method including the steps of: preparing the thermosetting polyurethane composition by mixing the polyol component, the polyisocyanate component, and the tackifier with stirring; and curing the thermosetting polyurethane composition.

The laminate of the present invention is a laminate including: the optically clear adhesive sheet of the present invention; a first release liner covering one surface of the optically clear adhesive sheet; and a second release liner covering the other surface of the optically clear adhesive sheet.

The display device with a touchscreen according to the present invention includes: the optically clear adhesive sheet of the present invention; a display panel; and a touchscreen.

Advantageous Effects of Invention

The optically clear adhesive sheet of the present invention can reduce delay bubble generation, while retaining the superior properties of a thermosetting polyurethane composition having excellent flexibility and being capable of giving a thick film. The optically clear adhesive sheet of the present invention bonded to glass can achieve a lasting, stable bonding interface. The optically clear adhesive sheet of the present invention is therefore suited to use in displays and tablet PCs, for example.

The method for producing an optically clear adhesive sheet according to the present invention enables suitable production of the above optically clear adhesive sheet. The laminate of the present invention can improve the handleability of the optically clear adhesive sheet of the present invention. The display device with a touchscreen according to the present invention can improve the visibility of the display screen.

DESCRIPTION OF EMBODIMENTS

Figure 1:
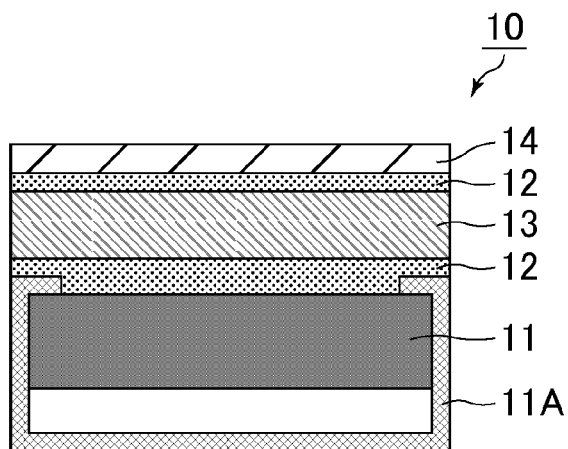
FIG. 1 shows a schematic cross-sectional view of an exemplary display device with a touchscreen which includes the optically clear adhesive sheets of the present invention.

The optically clear adhesive sheet of the present invention is an optically clear adhesive sheet formed of a cured product of a thermosetting polyurethane composition. The optically clear adhesive sheet features a shear storage modulus (G') at 85° C. of $4.5 \times 10^3$ to $5.0 \times 10^4$ Pa, a loss tangent (tan δ) at 85° C. of 0.3 to 0.97, and a thickness of 50 to 2000 μm. The "optically clear adhesive sheet" as used herein has the same meaning as an "optically clear adhesive film".

The optically clear adhesive sheet of the present invention has a shear storage modulus (G') at 85° C. of $4.5 \times 10^3$ to $5.0 \times 10^4$ Pa and a loss tangent (tan δ) at 85° C. of 0.3 to 0.97. The studies made by the present inventors have found that an effective way to reduce delay bubble generation is to minimize floating of the bonding surface of the sheet. In order to eliminate floating, the contact properties (capability to conform to uneven surfaces) and the adhesive strength of the sheet need to be enhanced. In this respect, the optically clear adhesive sheet is expected to achieve the effect of reducing delay bubble generation if the sheet can be in a state very close to a gel because in such a state, the sheet can deform according to the surface shape of the optical member to exhibit excellent capability to conform to uneven surfaces and the sheet would have almost no resilience after the deformation. The inventors have therefore decided to use the shear storage modulus as a hardness index and studied use of the loss tangent as a viscoelasticity index. They have then found that with these two indexes at 85° C. falling within the respective ranges, the optically clear adhesive sheet can be in a state very close to a gel and thus exhibits reduced delay bubble generation. The lower limit of the shear storage modulus at 85° C. is preferably $4.8 \times 10^3$ Pa and the upper limit thereof is preferably $1.2 \times 10^4$ Pa. The lower limit of the loss tangent at 85° C. is preferably 0.56 and the upper limit thereof is preferably 0.95. The shear storage modulus and loss tangent at 85° C. can be controlled by adjusting the composition and/or the thermosetting conditions of the thermosetting polyurethane composition, such as the $\alpha$ ratio (the number of moles of OH groups derived from the polyol component/the number of moles of NCO groups derived from the polyisocyanate component), addition of a plasticizer, the amount of the plasticizer to be added, and the crosslinking temperature.

The optically clear adhesive sheet of the present invention preferably has a thickness falling within the range of 50 to 2000 μm. If the optically clear adhesive sheet has a thickness of less than 50 μm, reduction in delay bubble generation is difficult even with the shear storage modulus and the loss tangent falling within the respective ranges in the present invention. Also, the sheet, when one of its surfaces is bonded to the surface of an optical member, may not be able to conform to a rough, uneven surface of the optical member. As a result, the other surface of the optically clear adhesive sheet may fail to be bonded to another optical member with a sufficient adhesive strength. The optically clear adhesive sheet having a thickness of more than 2000 μm may be insufficient in optical characteristics such as haze and total light transmittance. The lower limit of the thickness of the optically clear adhesive sheet is preferably 100 μm, more preferably 200 μm, and the upper limit thereof is preferably 1500 μm, more preferably 1000 μm. The optically clear adhesive sheet preferably has a thickness that is triple or more the height of the highest peak of a rough, uneven bonding surface of the adherend.

The optically clear adhesive sheet of the present invention preferably has an adhesive strength measured by a 180° peel test of 2 N/25 mm or more. If the optically clear adhesive sheet has an adhesive strength less than 2 N/25 mm, delay bubble generation may not be reduced even with the shear storage modulus and the loss tangent falling within the respective ranges in the present invention. The lower limit of the adhesive strength is preferably 5 N/25 mm, more preferably 7 N/25 mm, still more preferably 10 N/25 mm, and the upper limit thereof is preferably 15 N/25 mm. The optically clear adhesive sheet having an adhesive strength of 15 N/25 mm or less, when used to bond an optical member such as a touchscreen to another optical member, can be peeled off without adhesive residue, exhibiting excellent reworkability. If the adhesive strength of the optically clear adhesive sheet is very high, it may be difficult to remove air bubbles present between the optically clear adhesive sheet and the adherend. The details of the 180° peel test are described below.

The optically clear adhesive sheet of the present invention preferably has a micro rubber hardness (type A) falling within the range of 0.1° to 25°. The optically clear adhesive sheet having a micro rubber hardness (type A) of lower than 0.1° may exhibit low handleability in use (during bonding of an optical member) and may be deformed. In contrast, the optically clear adhesive sheet having a micro rubber hardness (type A) of higher than 25° may exhibit low flexibility and, during bonding of an optical member, may fail to conform to the surface shape of the optical member and include air between itself and the optical member. This may eventually cause peeling of the sheet from the optical member. Also, the optically clear adhesive sheet having low flexibility may fail to conform to an uneven surface on which the bezel is present, during bonding of an optical member such as a touchscreen to the display panel. The lower limit of the micro rubber hardness (type A) of the optically clear adhesive sheet is more preferably 0.5°, and the upper limit thereof is more preferably 15°, still more preferably 2°. The optically clear adhesive sheet having a micro rubber hardness (type A) of 2° or more is in a state very close to a gel, and therefore deforms according to the surface shape of the optical member, exhibiting excellent capability to conform to uneven surfaces. Also, since the optically clear adhesive sheet has almost no resilience, the sheet is expected to have the effect of reducing delay bubble generation. The micro rubber hardness (type A) can be measured with, for example, a micro durometer "MD-1 Type A" available from Kobunshi Keiki Co., Ltd. The micro durometer "MD-1 Type A" is a durometer designed and produced as an approximately ⅕-sized compact model of a spring type A durometer, and is capable of giving the same measurement result as a spring type A durometer even when the measuring object is thin.

The optically clear adhesive sheet of the present invention preferably has a haze of 0.5% or lower and a total light transmittance of 90% or higher in order to have the optically clear adhesive sheet characteristics. The haze and the total light transmittance can each be measured with, for example, a turbidity meter "Haze Meter NDH2000" available from Nippon Denshoku Industries Co., Ltd. The haze is measured by a process in accordance with JIS K 7136, and the total light transmittance is measured by a process in accordance with JIS K 7361-1.

Being formed of a cured product of a thermosetting polyurethane composition, the optically clear adhesive sheet of the present invention is flexible and, under tensile stress, elongated well and very unlikely to be torn. The optically clear adhesive sheet can therefore be peeled off without adhesive residue. Since the optically clear adhesive sheet of the present invention can be made thick while being flexible, the optically clear adhesive sheet is excellent in shock resistance and can be used to bond a transparent member having a transparent conductive film on its outer surface to a cover panel. In the case of using an additional member, the optically clear adhesive sheet can also be used to bond the display panel or the transparent member having a transparent conductive film on its outer surface to the additional member. The optically clear adhesive sheet of the present invention, being formed of a cured product of a thermosetting polyurethane composition, has a high dielectric constant and can give a higher capacitance than conventional optically clear adhesive sheets formed of an acrylic resin composition. The optically clear adhesive sheet of the present invention is therefore suitable for bonding of a capacitive touchscreen.

The cured product of a thermosetting polyurethane composition is preferably not an acrylic-modified one, and preferably contains no moiety derived from, for example, an acrylic ester or a methacrylic ester in the main chain. An acrylic-modified cured product of a thermosetting polyurethane composition is hydrophobic and is thus likely to cause moisture condensation in a high-temperature, high humidity environment. The moisture condensation may cause defects such as whitening and foaming to deteriorate the optical characteristics. With a non-acrylic-modified cured product of a thermosetting polyurethane composition, deterioration of the optical characteristics due to defects such as whitening and foaming in high-temperature, high-humidity environments can therefore be prevented.

The thermosetting polyurethane composition used to form the optically clear adhesive sheet of the present invention is described in detail below.

The thermosetting polyurethane composition in an ordinary state contains a polyol component and a polyisocyanate component. The cured product of a thermosetting polyurethane composition is obtained by reacting the polyol component and the polyisocyanate component as shown in the following reaction formula and has a structure represented by the following formula (A).

[Chem. 1]

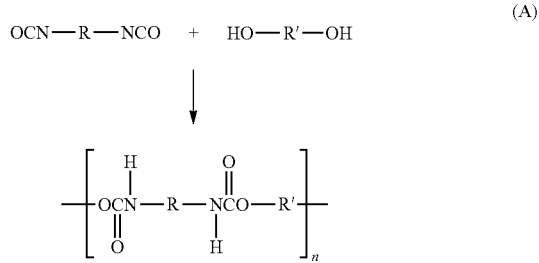

In the formula (A), R represents a non-NCO-group moiety of a polyisocyanate component, R' represents a non-OH-group moiety of a polyol component, and n represents the number of repeating units.

Both the polyol component and the polyisocyanate component can be components that are liquids at normal temperature (23° C.), so that a cured product of a thermosetting polyurethane composition can be obtained without a solvent. Other components such as a tackifier can be added to the polyol component or the polyisocyanate component, and are preferably added to the polyol component. Production of an optically clear adhesive sheet using a cured product of a thermosetting polyurethane composition, which requires no removal of a solvent, enables formation of a thick sheet with an even surface. The optically clear adhesive sheet of the present invention, when used to bond a display panel and a transparent member (touchscreen) having on its outer surface a transparent conductive film, can therefore conform to an uneven surface on which the bezel is present. Also, the optically clear adhesive sheet of the present invention can keep its optical characteristics even in the case of having a large thickness, and thus can sufficiently prevent transparency decrease (haze increase), coloring, and foaming (generation of air bubbles at the interface with the adherend).

[Polyol Component]

Non-limiting examples of the polyol component include polyether polyols, polycaprolactone polyols, polycarbonate polyols, and polyester polyols. These may be used alone or in combination with each other.

Examples of the polyether polyols include polyalkylene glycols (e.g., polyethylene glycol, polypropylene glycol, polypropylene triol, polypropylene tetraol, polytetramethylene glycol, polytetramethylene triol, copolymers thereof), derivatives obtained by introducing a side chain or a branched structure to any of these polyalkylene glycols, modified products thereof, and mixtures thereof.

Examples of the polycaprolactone polyols include polycaprolactone glycol, polycaprolactone triol, polycaprolactone tetraol, derivatives obtained by introducing a side chain or a branched structure to any of these, modified products thereof, and mixtures thereof.

Examples of the polycarbonate polyols include a reaction product of a dialkyl carbonate and a diol.

Examples of the dialkyl carbonate include dialkyl carbonates such as dimethyl carbonate and diethyl carbonate; diaryl carbonates such as diphenyl carbonate; and alkylene carbonates such as ethylene carbonate. These may be used alone or in combination with each other.

Example of the diol include 1,4-butanediol, diethylene glycol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, and 2,2'-bis(4-hydroxycyclohexyl)-propane. These may be used alone or in combination with each other. The diol is preferably a C4-C9 aliphatic or alicyclic diol. For example, 1,4-butanediol, diethylene glycol, 1,5-pentanediol, 1,6-hexanediol, 3-methyl-1,5-pentanediol, 2,4-dimethyl-1,5-pentanediol, 1,4-cyclohexanedimethanol, 1,7-heptanediol, 1,8-octanediol, 2-methyl-1,8-octanediol, and 1,9-nonanediol are preferably used alone or in combination with each other. The diol is also preferably a copolycarbonate diol of 1,6-hexanediol and 3-methyl-1,5-pentanediol or a copolycarbonate diol of 1,6-hexanediol and 1,5-pentanediol.

Examples of the polycarbonate polyols include polycarbonate glycol, polycarbonate triol, polycarbonate tetraol, derivatives obtained by introducing a side chain or a branched structure to any of these, modified products thereof, and mixtures thereof.

Examples of the polyester polyols include products obtained by dehydration condensation of a dicarboxylic acid and a glycol component.

Examples of the dicarboxylic acid include aromatic dicarboxylic acids (e.g., terephthalic acid, isophthalic acid, 2,6-naphthalenedicarboxylic acid), oxalic acid, malonic acid, succinic acid, glutaric acid, adipic acid, azelaic acid, and sebacic acid.

Examples of the glycol component include aliphatic glycols (e.g., ethylene glycol, 1,4-butanediol, diethylene glycol, neopentyl glycol, 3-methyl-1,5-pentanediol, 1,5-pentanediol, 1,9-nonanediol, triethylene glycol); alicyclic glycols (e.g., 1,4-cyclohexanedimethanol); aromatic diols (e.g., p-xylenediol); and polyoxyalkylene glycols (e.g., polyethylene glycol, polypropylene glycol, polytetramethylene glycol).

Polyester polyols formed of any of dicarboxylic acids and glycol components mentioned above have a linear molecular structure, but may be a polyester having a branched molecular structure obtained using a trivalent or higher valent ester-forming component. The dicarboxylic acid and the glycol component are reacted with a molar ratio of 1.1 to 1.3 at 150° C. to 300° C.

The polyol component preferably has a number average molecular weight falling within the range of 300 to 5000. If the polyol component has a number average molecular weight of less than 300, the polyol component and the polyisocyanate component may react with each other very fast and the resulting cured product of a thermosetting polyurethane composition may be difficult to mold into a sheet with an even surface or the cured product of a thermosetting polyurethane composition may be less flexible and fragile. If the polyol component has a number average molecular weight of more than 5000, problems may arise such as that the polyol component may have a very high viscosity to cause difficulty in molding the cured product of a thermosetting polyurethane composition into a sheet with an even surface and that the cured product of a thermosetting polyurethane composition may crystallize to make the product opaque. The lower limit of the number average molecular weight of the polyol component is more preferably 500, and the upper limit thereof is more preferably 3000, still more preferably 2000.

The polyol component preferably has an olefin skeleton, meaning that its main chain includes a polyolefin or a derivative thereof. Examples of the polyol component having an olefin skeleton include polybutadiene-based polyols such as 1,2-polybutadiene polyol, 1,4-polybutadiene polyol, 1,2-polychloroprene polyol, and 1,4-polychloroprene polyol, polyisoprene-based polyols, and saturated compounds obtained by adding hydrogen or halogen atoms to the double bonds of these polyols, for example. The polyol component may be a polyol obtained by copolymerizing a polybutadiene-based polyol, for example, with an olefin compound (e.g., styrene, ethylene, vinyl acetate, acrylic ester) or a hydrogenated compound thereof. The polyol component may have a linear or branched structure. The polyol components having an olefin skeleton may be used alone or in combination with each other.

Known examples of the polyol component having an olefin skeleton include a polyolefin polyol obtained by hydrogenating a hydroxy group-terminated polyisoprene ("EPOL®" available from Idemitsu Kosan Co., Ltd., number average molecular weight: 2500), both-end hydroxy group-terminated hydrogenated polybutadiene ("GI-1000" available from Nippon Soda Co., Ltd., number average molecular weight: 1500), and polyhydroxy polyolefin oligomer ("POLYTAIL®" available from Mitsubishi Chemical Corporation)

[Polyisocyanate Component]

The polyisocyanate component may be any polyisocyanate such as a known polyisocyanate. The polyisocyanate component is preferably a modified polyisocyanate obtained by reacting an acyclic aliphatic and/or alicyclic polyisocyanate containing an isocyanate group with an ether compound having an ethylene oxide unit. An acyclic aliphatic and/or alicyclic polyisocyanate can reduce the chances of coloring or discoloration of the optically clear adhesive sheet and enables the optically clear adhesive sheet to exhibit long-lasting transparency with higher reliability. Also, being modified with an ether compound having an ethylene oxide unit, the polyisocyanate component can prevent whitening owing to its hydrophilic moiety (ethylene oxide unit) and can exhibit compatibility with low-polarity components such as a tackifier and a plasticizer owing to its hydrophobic moiety (the other units).

The "acyclic aliphatic and/or alicyclic polyisocyanate" refers to one or more of the following: aliphatic diisocyanates, alicyclic diisocyanates, and polyisocyanates synthesized from starting materials of acyclic aliphatic and/or alicyclic diisocyanates.

Examples of the aliphatic polyisocyanate include hexamethylene diisocyanate (HDI), tetramethylene diisocyanate, 2-methyl-pentane-1,5-diisocyanate, 3-methyl-pentane-1,5-diisocyanate, lysine diisocyanate, trioxyethylene diisocyanate, and modified products thereof. These compounds may be used alone or in combination with each other. Examples of the alicyclic polyisocyanate include isophorone diisocyanate, cyclohexyl diisocyanate, dicyclohexylmethane-4,4'-diisocyanate, norbornene diisocyanate, hydrogenated trilene diisocyanate, hydrogenated xylene diisocyanate, hydrogenated tetramethylxylene diisocyanate, and modified products thereof. These may be used alone or in combination with each other. Preferred among these specific examples are hexamethylene diisocyanate, isophorone diisocyanate, and modified products thereof, with hexamethylene diisocyanate and modified products thereof being particularly preferred. Examples of the modified products of hexamethylene diisocyanate include isocyanurate-modified, allophanate-modified, or urethane-modified products of hexamethylene diisocyanate.

Examples of the ether compound having an ethylene oxide unit include alcohol-ethylene oxide adducts, phenol-ethylene oxide adducts, or amine-ethylene oxide adducts. In order to improve the hydrophilicity, ether compounds having three or more ethylene oxide units per molecule are preferred.

Examples of the alcohol-ethylene oxide adducts include ethylene oxide adducts of monohydric alcohols, dihydric alcohols (e.g., ethylene glycol, diethylene glycol, propylene glycol, dipropylene glycol, 1,4-butanediol, 1,6-hexanediol, 1,3-butylenediol, neopentyl glycol), and trihydric alcohols (e.g., glycerol, trimethylol propane). These may be used alone or in combination with each other.

Examples of the phenol-ethylene oxide adducts include ethylene oxide adducts of hydroquinone, bisphenols (e.g., bisphenol A, bisphenol F), and phenol-formaldehyde condensates with a low condensation degree (novolac resin and resol prepolymers). These may be used alone or in combination with each other.

The ethylene oxide unit content preferably falls within the range of 1 to 20 wt % of the entire thermosetting polyurethane composition. If the ethylene oxide unit content is lower than 1 wt %, whitening may not be sufficiently prevented. If the ethylene oxide unit content is higher than 20 wt %, the compatibility with the low-polarity components such as a tackifier and a plasticizer may be low and thus the optical characteristics such as haze may be poor.

The number of isocyanate groups per molecule of the modified polyisocyanate is preferably 2.0 or more on average. If the number of isocyanate groups is less than 2.0 on average, the crosslinking density may be low, leading to insufficient curing of the thermosetting polyurethane composition.

The thermosetting polyurethane composition as used herein preferably has an $\alpha$ ratio (the number of moles of OH groups derived from the polyol component/the number of moles of NCO groups derived from the polyisocyanate component) of 1.6 to 1.96. If the thermosetting polyurethane composition has an $\alpha$ ratio lower than 1.6, the resulting cured product of the thermosetting polyurethane composition may be hard and contain delay bubbles. If the thermosetting polyurethane composition has an $\alpha$ ratio higher than 1.96, the thermosetting polyurethane composition may not be sufficiently cured. The lower limit of the $\alpha$ ratio is more preferably 1.82, and the upper limit of the $\alpha$ ratio is more preferably 1.9.

[Tackifier]

The thermosetting polyurethane composition of the present invention preferably further contains a tackifier (adhesive-imparting agent). A tackifier is an additive that is added to enhance the adhesive strength, and is typically an amorphous oligomer having a molecular weight of several hundreds to several thousands which is a thermoplastic resin in a liquid or solid state at normal temperature. A thermosetting polyurethane composition containing a tackifier imparts an enhanced adhesive strength to an optically clear adhesive sheet formed of a cured product of the thermosetting polyurethane composition.

Examples of the tackifier include, but are not particularly limited to, petroleum resin-based tackifiers, hydrocarbon resin-based tackifiers, rosin-based tackifiers, and terpene-based tackifiers. These may be used alone or in combination with each other.

The tackifier is preferably a petroleum resin-based tackifier because it has excellent compatibility with components such as the polyol component having an olefin skeleton. An especially preferred petroleum resin-based tackifier is a hydrogenated petroleum resin obtained by hydrogenating a copolymer of dicyclopentadiene and an aromatic compound. Dicyclopentadiene is obtainable from a C5 fraction. Examples of the aromatic compound include vinyl aromatic compounds such as styrene, α-methylstyrene, and vinyl toluene. The ratio of dicyclopentadiene to a vinyl aromatic compound is not particularly limited, but the ratio by weight of dicyclopentadiene to a vinyl aromatic compound (dicyclopentadiene: vinyl aromatic compound) is preferably 70:30 to 20:80, more preferably 60:40 to 40:60. The hydrogenated petroleum resin has a softening point of preferably 90° C. to 160° C., a vinyl aromatic compound unit content of preferably 35 mass % or less, a bromine value of preferably 0 to 30 g/100 g, and a number average molecular weight of preferably 500 to 1100. Known examples of the hydrogenated petroleum resin include "I-MARV P-100" available from Idemitsu Kosan Co., Ltd.

The tackifier is also preferably a hydrocarbon resin-based tackifier because it has excellent compatibility with components such as the polyol component having an olefin skeleton. An especially preferred hydrocarbon resin-based tackifier is an alicyclic saturated hydrocarbon resin. Known examples of the alicyclic saturated hydrocarbon resin include "ARKON P-100" available from Arakawa Chemical Industries, Ltd.

The tackifier preferably has an acid value of 1 mgKOH/g or less. The tackifier with an acid value of 1 mgKOH/g or less can be sufficiently prevented from inhibiting the reaction between the polyol component and the polyisocyanate component. The tackifier preferably has a softening point falling within the range of 80° C. to 120° C., more preferably within the range of 80° C. to 100° C. With a softening point falling within the range of 80° C. to 120° C., heat deterioration of the polyol component can be avoided when the tackifier is dissolved in the polyol component.

The tackifier content preferably falls within the range of 1 to 20 wt % of the thermosetting polyurethane composition. If the tackifier content is lower than 1 wt %, the resulting optically clear adhesive sheet may exhibit insufficient adhesive strength, especially in high-temperature, high-humidity environments. If the tackifier content is higher than 20 wt %, the tackifier may inhibit the reaction between the polyol component and the polyisocyanate component to cause insufficient urethane crosslinking during curing of the thermosetting polyurethane composition. As a result, the resulting optically clear adhesive sheet may be melted and deformed or cause tackifier separation (bleeding) in high-temperature, high-humidity environments. Also, the reaction time for the polyol component and the polyisocyanate component could be lengthened to allow sufficient urethane crosslinking, but this deteriorates the productivity.

[Plasticizer]

The thermosetting polyurethane composition may further contain a plasticizer. Addition of a plasticizer decreases the rigidity, thereby improving the handleability of the optically clear adhesive sheet of the present invention and the capability of the optically clear adhesive sheet to conform to uneven surfaces. The addition of a plasticizer may possibly reduce the adhesive strength, but the optically clear adhesive sheet of the present invention, even with such a little reduced adhesive strength, can ensure sufficient adhesive strength.

The plasticizer may be any compound that is used to impart flexibility to a thermoplastic resin, and preferably contains a carboxylic acid-based plasticizer in terms of compatibility and weather resistance. Examples of the carboxylic acid-based plasticizer include phthalic esters (phthalic acid-based plasticizers) (e.g., diundecyl phthalate, dioctyl phthalate, diisononyl phthalate, diisodecyl phthalate, and dibutyl phthalate); 1,2-cyclohexanedicarboxylic acid diisononyl ester; adipic acid esters; trimellitic acid esters; maleic acid esters; benzoic acid esters; and poly-α-olefin. These may be used alone or in combination with each other. Known examples of the carboxylic acid-based plasticizer include "DINCH" available from BASF, "SANSO CIZER DUP" available from New Japan Chemical Co., Ltd., and "Durasyn® 148" available from Ineous Oligomers.

[Catalyst]

The thermosetting polyurethane composition may further contain a catalyst. The catalyst may be any catalyst that is used in a urethane modification reaction. Examples thereof include organotin compounds (e.g., di-n-butyltin dilaurate, dimethyltin dilaurate, dibutyltin oxide, tin octanoate); organotitanium compounds; organozirconium compounds; tin carboxylates; bismuth carboxylates; and amine-based catalysts (e.g., triethylene diamine).

The catalyst is preferably a non-amine-based catalyst. In the case of using an amine-based catalyst, the optically clear adhesive sheet may be easily discolored. More preferred as the catalyst is dimethyltin dilaurate.

The amount of the catalyst added preferably falls within the range of 0.001 to 0.1 wt % of the total amount of the polyol component and the polyisocyanate component.

The thermosetting polyurethane composition may further contain a monoisocyanate component. The monoisocyanate component is a compound containing one isocyanate group in a molecule. Specific examples thereof include octadecyl diisocyanate (ODI), 2-methacryloyloxyethyl isocyanate (MOI), 2-acryloyloxyethyl isocyanate (AOI), octyl isocyanate, heptyl isocyanate, ethyl 3-isocyanatopropionate, cyclopentyl isocyanate, cyclohexyl isocyanate, 1-isocyanato-2-methoxyethane, ethyl isocyanatoacetate, butyl isocyanatoacetate, and p-toluenesulfonyl isocyanate. These may be used alone or in combination with each other. The thermosetting polyurethane composition preferably contains no monoisocyanate component.

The thermosetting polyurethane composition may contain, as necessary, various additives such as colorants, stabilizers, antioxidants, antifungal agents, and flame retardants as long as the characteristics required for the optically clear adhesive sheet are not deteriorated.

The optically clear adhesive sheet of the present invention may have a release liner on each surface. A laminate including the optically clear adhesive sheet of the present invention, a first release liner covering one surface of the optically clear adhesive sheet, and a second release liner covering the other surface of the optically clear adhesive sheet (hereinafter, such a laminate is referred to as "the laminate of the present invention") is also one aspect of the present invention. The first and second release liners can protect the surfaces of the optically clear adhesive sheet of the present invention until immediately before the sheet is bonded to an adherend. The release liners therefore prevent deterioration of adhesion and sticking of foreign matters. Also, the surfaces can be prevented from being bonded to something other than the adherend, so that the handleability of the optically clear adhesive sheet of the present invention can be improved.

The first and second release liners can each be, for example, a polyethylene terephthalate (PET) film. The materials of the first release liner and the second release liner may be the same as or different from each other, and the thicknesses thereof may also be the same as or different from each other.

The bonding strength (peel strength) between the optically clear adhesive sheet of the present invention and the first release liner and the bonding strength between the optically clear adhesive sheet of the present invention and the second release liner are preferably different from each other. Such a difference in bonding strength makes it easy to peel one of the first and second release liners (release liner with lower bonding strength) alone from the laminate of the present invention and bond the exposed first surface of the optically clear adhesive sheet and the first adherend to each other, followed by peeling the other of the first and second release liners (release liner with higher bonding strength) and then bonding the exposed second surface of the optically clear adhesive sheet and the second adherend to each other. Easy-peel treatment (release treatment) may be conducted on one or both of the surface of the first release liner coming into contact with the optically clear adhesive sheet of the present invention and the surface of the second release liner coming into contact with the optically clear adhesive sheet of the present invention. Examples of the easy-peel treatment include siliconizing.

Application of the optically clear adhesive sheet of the present invention may be, but is not particularly limited to, bonding of members such as a display panel, a touchscreen, and a cover panel to each other, for example. A display device with a touchscreen including the optically clear adhesive sheet of the present invention, a display panel, and a touchscreen (hereinafter, such a display device is also referred to as "the display device with a touchscreen according to the present invention") is also one aspect of the present invention.

FIG. 1 shows a schematic cross-sectional view of an exemplary display device with a touchscreen which includes the optically clear adhesive sheets of the present invention. A display device 10 shown in FIG. 1 includes a display panel 11, an optically clear adhesive sheet 12, a touchscreen (glass substrate with an ITO transparent conductive film) 13, another optically clear adhesive sheet 12, and a transparent cover panel 14 stacked in the given order. The three optical members, namely the display panel 11, the touchscreen 13, and the transparent cover panel 14, are integrated into one member with the two optically clear adhesive sheets 12 of the present invention. The display panel 11 can be of any type, such as a liquid crystal panel or an organic electroluminescent panel (organic EL panel). The touchscreen 13 can be, for example, a resistive touchscreen or a capacitive touchscreen.

The display panel 11 is housed in a bezel (housing for the display panel 11) 11A that is provided with an opening in its surface close to the display surface. The outer edge of the opening of the bezel 11A has produced the uneven surface with peaks corresponding to the thickness of the bezel 11A. The optically clear adhesive sheet 12 bonded covers the display surface sides of the display panel 11 and the bezel 11A to conform to the uneven surface with peaks corresponding to the thickness of the bezel 11A. In order to conform to the uneven surface with peaks corresponding to the thickness of the bezel 11A, the optically clear adhesive sheet 12 is required to have flexibility with which the sheet can conform to uneven surfaces and to be thicker than the bezel 11A. Thus, for example, the optically clear adhesive sheet 12 used to bond an optical member to the display panel 11 housed in the bezel 11A preferably has a thickness of 700 μm or larger. The optically clear adhesive sheet 12 of the present invention exhibits sufficient optical characteristics and flexibility even in the case of having a thickness of 700 μm or larger, and is therefore suited to bonding of an optical member to the display panel 11 housed in the bezel 11A.

The optically clear adhesive sheet of the present invention employed in such a display device is less likely to decrease in the adhesive strength under various conditions, and enables lasting, tight bonding of the optical members. As a result, no gap is formed between the optical members and the optically clear adhesive sheet, so that deterioration of visibility due to factors such as an increase in the interfacial reflection can be prevented. In particular, the optically clear adhesive sheet of the present invention is suitable for a display device incorporated into an automotive navigation system which needs to have high reliability, for example.

The optically clear adhesive sheet of the present invention may be produced by any method such as a method in which a thermosetting polyurethane composition is prepared, and then the composition is molded while being heat-cured by a known method. The method preferably includes the steps of preparing a thermosetting polyurethane composition by mixing a polyol component, a polyisocyanate component, and a tackifier with stirring, and curing the thermosetting polyurethane composition.

The following is a specific example of the production method. First, a masterbatch is prepared by adding a given amount of a tackifier to a polyol component and dissolving the tackifier by stirring while heating. The obtained masterbatch, an additional polyol component, and a polyisocyanate component as well as other components such as a catalyst as necessary are mixed with stirring using a mixer, for example, so that a liquid or gel thermosetting polyurethane composition is obtained. The thermosetting polyurethane composition is immediately fed into a molding machine such that the thermosetting polyurethane composition is crosslinked and cured while being transported in the state of being sandwiched between the first and second release liners. Thereby, the thermosetting polyurethane composition is semi-cured into a sheet integrated with the first and second release liners. The sheet is then crosslinked in a furnace for a given period of time, whereby an optically clear adhesive sheet formed of a cured product of a thermosetting polyurethane composition is obtained. Through these steps, the laminate of the present invention is formed.

Figure 2:
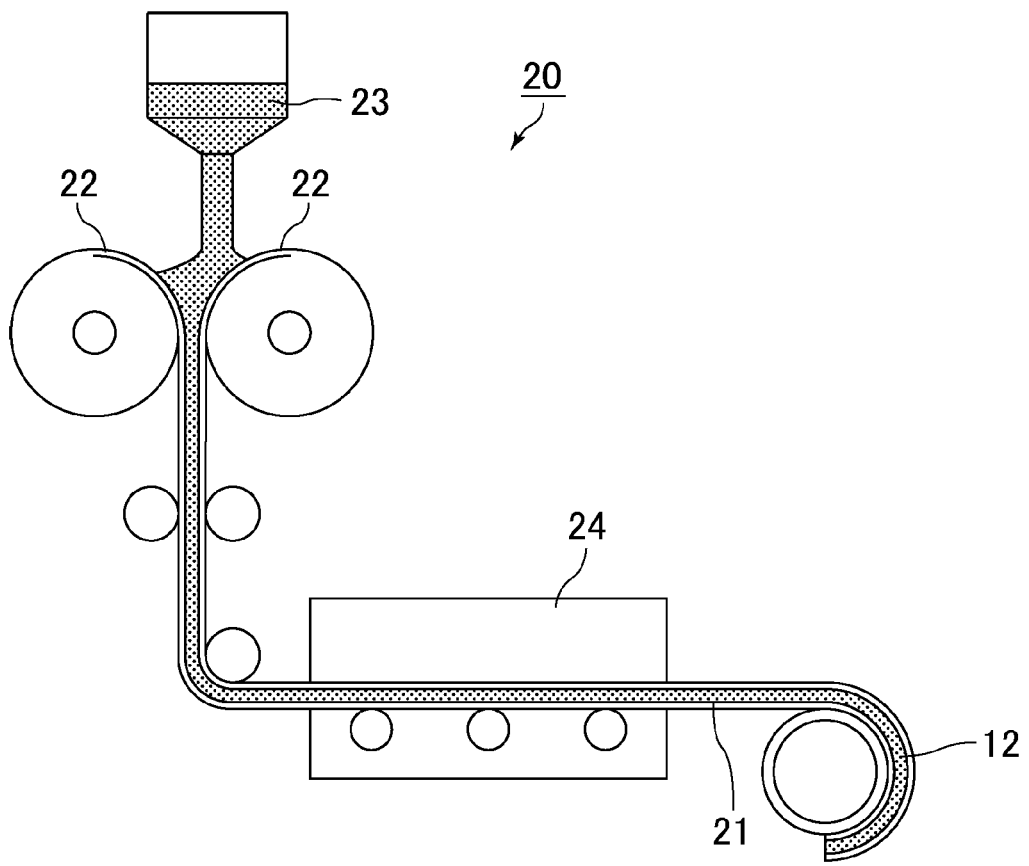
FIG. 2 shows a schematic view for describing an exemplary molding machine used in production of the optically clear adhesive sheet of the present invention.

FIG. 2 shows a schematic view for describing an exemplary molding machine used in production of the optically clear adhesive sheet of the present invention. In a molding machine 20 shown in FIG. 2, a liquid or gel uncured thermosetting polyurethane composition 23 is poured between paired release liners (PET films) 21 continuously fed by paired molding rollers 22 which are disposed with a space in between. With the thermosetting polyurethane composition 23 retained between the release liners 21, the composition is transported into a heating machine 24 while being cured (crosslinked). In the heating machine 24, the thermosetting polyurethane composition 23 is heat-cured while being retained between the release liners (PET films)

21, whereby molding of the optically clear adhesive sheet 12 formed of a cured product of a thermosetting polyurethane composition is completed.

The method for producing the optically clear adhesive sheet of the present invention may include, after preparation of an uncured thermosetting polyurethane composition, film formation using a general film-forming machine (e.g., any of various coating machines, bar coater, doctor blade) or by a general film-forming treatment. The optically clear adhesive sheet of the present invention may alternatively be produced by centrifugal molding.

EXAMPLES

The present invention is described in more detail below based on examples. The examples, however, are not intended to limit the scope of the present invention.
(Materials)
Materials used to prepare a thermosetting polyurethane composition in the following examples and comparative examples are listed below.
(A) Polyol Component
  Polyolefin polyol ("EPOL®" available from Idemitsu Kosan Co., Ltd., number average molecular weight: 2500)
(B) Polyisocyanate Component
  Hexamethylene diisocyanate (HDI)-based polyisocyanate (Tosoh Corporation)
(C) Tackifier
  Hydrogenated petroleum resin-based tackifier ("I-MARV P-100" available from Idemitsu Kosan Co., Ltd.)
(D) Catalyst
  Dimethyltin dilaurate ("Fomrez catalyst UL-28" available from Momentive)

The HDI-based polyisocyanate has a structure shown in the following structural formula, which is obtained by reacting a polyisocyanate having HDI-derived structures with an ether polyol having n (n is six or more on average) ethylene oxide units (hydrophilic structures) per molecule thereof.

[Chem. 2]

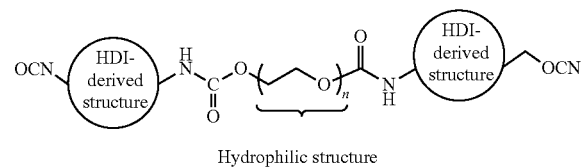

Hydrophilic structure

Example 1

First, a solid hydrogenated petroleum resin-based tackifier was added to a polyolefin polyol whose temperature was controlled to 100° C. to 150° C., and the mixture was stirred so that a tackifier masterbatch containing a tackifier dissolved in a polyolefin polyol was obtained. Here, the tackifier content in the tackifier masterbatch was adjusted to 30 wt %. Also, to a polyolefin polyol (99 parts by weight) was added dimethyltin dilaurate (1 part by weight), and they were mixed with stirring using an oscillating model agitator "Ajiter". Thereby, a catalyst masterbatch was obtained.

A polyolefin polyol (100 parts by weight), the HDI-based polyisocyanate (23.3 parts by weight), the tackifier masterbatch (161.2 parts by weight), and the catalyst masterbatch (1.3 parts by weight) were mixed with stirring using an oscillating model agitator "Ajiter". Thereby, a thermosetting polyurethane composition was prepared.

The obtained thermosetting polyurethane composition was fed into the molding machine 20 shown in FIG. 2. The thermosetting polyurethane composition was crosslinked and cured at a furnace temperature of 50° C. to 90° C. for a furnace time of a few minutes while being transported in the state of being sandwiched between the paired release liners (PET films with release-treated surfaces) 21, and thereby a sheet with the release liners 21 was obtained. The sheet was crosslinked in the heating machine 24 for 10 to 15 hours, so that the optically clear adhesive sheet 12 having the release liner 21 on each surface and formed of a cured product of a thermosetting polyurethane composition (hereinafter, such a sheet is also referred to as an "optically clear adhesive sheet with release liners") was produced.

Figure 3:
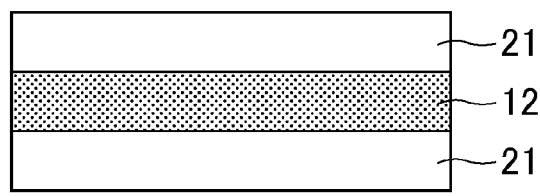
FIG. 3 shows a schematic cross-sectional view of an optically clear adhesive sheet with release liners of Example 1.

FIG. 3 shows a schematic cross-sectional view of an optically clear adhesive sheet with release liners of Example 1. As shown in FIG. 3, the obtained optically clear adhesive sheet with release liners was a laminate of the release liner 21, the optically clear adhesive sheet 12 formed of a cured product of a thermosetting polyurethane composition, and the release liner 21 stacked in the given order. The optically clear adhesive sheet 12 had a thickness of 1000 μm.

Examples 2 to 6 and Comparative Examples 1 to 4

Optically clear adhesive sheets with release liners of Examples 2 to 6 and Comparative Examples 1 to 4 were each produced by a procedure similar to that in Example 1, except that the composition or the thickness of the optically clear adhesive sheet 12 was changed as shown in the following Table 1. The thickness of the optically clear adhesive sheet 12 was adjusted by changing the space between the paired molding rollers 22.

TABLE 1

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| (A) Polyol component (parts by weight) | 100.0 | 100.0 | 100.0 | 100.0 | 100.0 | 100.0 | 100.0 | 100.0 | 100.0 | 100.0 |
| (B) Polyisocyanate component (parts by weight) | 23.3 | 26.4 | 22.8 | 23.3 | 23.3 | 24.4 | 30.4 | 22.2 | 23.3 | 23.3 |
| (C) Tackifier masterbatch (parts by weight) | 161.2 | 165.3 | 160.5 | 161.2 | 161.2 | 162.7 | 170.5 | 159.9 | 161.2 | 161.2 |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| (D) Catalyst masterbatch (parts by weight) | 1.3 | 1.3 | 1.3 | 1.3 | 1.3 | 1.3 | 1.4 | 1.3 | 1.3 | 1.3 |
| α Ratio | 1.9 | 1.7 | 1.94 | 1.9 | 1.9 | 1.82 | 1.5 | 1.98 | 1.9 | 1.9 |
| Thickness (μm) | 1000 | 1000 | 1000 | 50 | 2000 | 1000 | 1000 | 1000 | 40 | 2500 |

(Characteristics and Evaluation of Optically Clear Adhesive Sheet)

The following evaluations were conducted on the optically clear adhesive sheets with release liners produced in the examples and comparative examples: (1) shear storage modulus and loss tangent measurement; (2) adhesive strength measurement; (3) micro rubber hardness (type A) measurement; (4) haze measurement; (5) durability test; and (6) delay bubble test. The results are shown in Table 2.

(1) Shear Storage Modulus (G') and Loss Tangent (Tan δ) Measurement

The shear storage modulus and loss tangent of the optically clear adhesive sheet were measured using a viscoelasticity measuring device "Physica MCR301" available from Anton Paar Germany GmbH. The measuring plate used was PP12, and the measuring conditions were a strain of 0.1%, a frequency of 1 Hz, and a cell temperature of 25° C. to 100° C. (temperature rise rate: 3° C./min). The following Table 2 shows the shear storage moduli and loss tangents measured at 85° C.

(2) Adhesive Strength Measurement

Figure 4A:
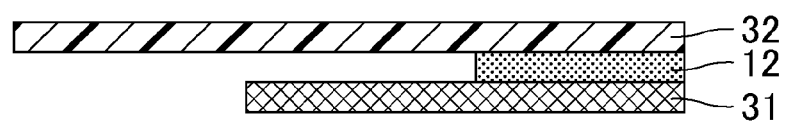
FIG. 4(a) and FIG. 4(b) shows schematic views for describing the method for evaluating the adhesive strength of the optically clear adhesive sheets of examples and comparative examples.
Figure 4B:
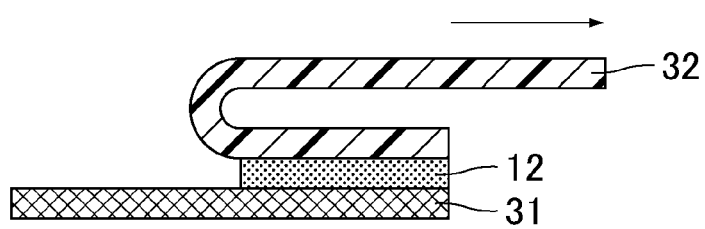

The adhesive strength (N/25 mm) was measured by a 180° peel test conducted by the following method. FIG. 4(a) and FIG. 4(b) shows schematic views for describing the method for evaluating the adhesive strength of the optically clear adhesive sheets of examples and comparative examples. First, each optically clear adhesive sheet with release liners was cut into a sample having a size of 75 mm (length)×25 mm (width). One of the release liners of the sample was peeled off, and the exposed optically clear adhesive sheet 12 of the sample was bonded to a microscope slide 31 having a size of 75 mm (length)×25 mm (width). The members were retained in this state under a pressure of 0.4 MPa for 30 minutes, so that the optically clear adhesive sheet 12 and the microscope slide 31 were bonded to each other. The other release liner on the side opposite to the microscope slide 31 was then peeled off, and a PET sheet ("Melinex® S" available from Teijin DuPont Films) 32 having a thickness of 125 μm was bonded to the surface of the optically clear adhesive sheet 12 on the side opposite to the microscope slide 31 as shown in FIG. 4(a).

The sample was then left to stand in a normal-temperature, normal-humidity environment (temperature: 23° C., humidity: 50%) for 12 hours. The adhesive strength of the optically clear adhesive sheet 12 to the microscope slide 31 was measured by pulling the PET sheet 32 in a 180° direction as shown in FIG. 4(b) such that the optically clear adhesive sheet 12 was separated from the microscope slide 31 at the interface therebetween. In each of the examples and comparative examples, two samples were prepared for the measurement. The average of the obtained two measurement values was used as the measurement result in each of the examples and comparative examples.

(3) Micro Rubber Hardness (Type A) Measurement

The optically clear adhesive sheets from which release liners were peeled off were stacked such that a laminate having a thickness of 4 mm was obtained. The obtained laminate was cut into a sample having a size of 75 mm (length)×25 mm (width). The hardness of the sample at normal temperature was measured with a micro durometer "MD-1 Type A" available from Kobunshi Keiki Co., Ltd. In this measurement, a cylindrical indenter having a diameter of 0.16 mm and a height of 0.5 mm was used. In each of the examples and comparative examples, one sample was prepared and subjected to the measurement four times. The median of the obtained four measurement values was used as the measurement result in each of the examples and comparative examples.

(4) Initial Haze Measurement

Each optically clear adhesive sheet from which both release liners were peeled off was sandwiched by soda-lime glass plates each having a thickness of 1.3 mm (available from Matsunami Glass Ind., Ltd.), whereby a sample of a laminate including the glass plate, the optically clear adhesive sheet, and the glass plate in the given order was produced. The haze of this sample was measured by a method in conformity with JIS K 7136 using a turbidity meter "Haze Meter NDH2000" available from Nippon Denshoku Industries Co., Ltd. In each of the examples and comparative examples, three samples were prepared and subjected to the measurement in a normal-temperature, normal-humidity environment. The average of the obtained three measurement values was used as the measurement result in each of the examples and comparative examples.

(5) Durability Test

One of the release liners of each optically clear adhesive sheet with release liners was peeled off, and the exposed optically clear adhesive sheet of the workpiece was bonded to a microscope slide (made of soda-lime glass). The members were retained in this state under a pressure of 0.4 MPa for 30 minutes, so that the optically clear adhesive sheet and the microscope slide were bonded to each other. The other release liner on the side opposite to the microscope slide was then peeled off. The resulting samples were left to stand, one in a high-temperature, normal-humidity environment (95° C.) and the other in a high-temperature, high-humidity environment (85° C., 85%), each for 168 hours. Thereafter, the optically clear adhesive sheets were visually observed for appearance changes (generation of air bubbles and whitening) and changes in sheet shape. Here, in the high-temperature, normal-humidity environment, the temperature was set to 95° C. using a convection oven, but the humidity was not controlled.

(6) Delay Bubble Test

A glass plate was covered with an appropriate amount of glass particles having a particle size of 0.02 μm. To this glass plate was bonded an optically clear adhesive sheet using a vacuum bonding machine "TPL-0210MH" available from Takatori Corporation. The bonding conditions were a degree of vacuum of 50 Pa, a bonding pressure of 2.1 kg/cm², and a pressing time of 10 seconds. After being left to stand at 85° C. for 12 hours, the optically clear adhesive sheet bonded to the glass plate was visually observed for the presence or absence of sheet floating (whether or not the optically clear adhesive sheet peeled off the glass plate) at and around the portions covered with the glass particles.

the polyisocyanate component is a modified polyisocyanate that is obtained by reacting an acyclic aliphatic and/or alicyclic polyisocyanate containing an isocyanate group with an ether compound containing an ethylene oxide unit, the thermosetting polyurethane composition has an α ratio, which is the number of moles of OH groups derived from the polyol component/the number of moles of NCO groups derived from the polyisocyanate component, of 1.6 to 1.96,

TABLE 2

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Shear storage modulus (Pa) | $7.3 \times 10^3$ | $2.1 \times 10^4$ | $4.8 \times 10^3$ | $7.3 \times 10^3$ | $7.3 \times 10^3$ | $1.2 \times 10^4$ | $8.2 \times 10^4$ | $4.1 \times 10^3$ | $7.3 \times 10^3$ | $7.3 \times 10^3$ |
| Loss tangent | 0.74 | 0.40 | 0.95 | 0.74 | 0.74 | 0.56 | 0.18 | 1.0 | 0.74 | 0.74 |
| Adhesive strength (N/25 mm) | 10.9 | 2.1 | 12.1 | 6 | 13 | 9 | 0.2 | 14.7 | 3 | 14 |
| Micro rubber hardness (type A) (° C.) | 1.2 | 5.2 | 0.7 | 1.2 | 1.2 | 1.8 | 11.2 | 0.5 | 1.2 | 1.2 |
| Haze (%) | 0.25 | 0.18 | 0.23 | 0.15 | 0.44 | 0.24 | 0.27 | 0.2 | 0.2 | 0.56 |
| Appearance changes at high high temperature and normal humidity | Absent | Absent | Absent | Absent | Absent | Absent | Absent | Absent | Absent | Absent |
| Appearance changes at high temperature and high humidity | Absent | Absent | Absent | Absent | Absent | Absent | Absent | Absent | Absent | Absent |
| Changes in sheet shape at high temperature and high humidity | Absent | Absent | Absent | Absent | Absent | Absent | Absent | Partially deformed | Absent | Absent |
| Delay bubble generation | Absent | Absent | Absent | Absent | Absent | Absent | Present | Absent | Present | Absent |

As shown in Table 1 and Table 2, the optically clear adhesive sheets of Examples 1 to 6 were good in all of haze (transparency), durability test, and delay bubble test. In contrast, the optically clear adhesive sheet of Comparative Example 1 whose shear storage modulus was higher than the upper limit in the present invention and loss tangent was lower than the lower limit in the present invention caused delay bubbles. The optically clear adhesive sheet of Comparative Example 2 whose shear storage modulus was lower than the lower limit in the present invention and loss tangent was higher than the upper limit in the present invention caused changes in sheet shape in a high-temperature, high-humidity environment. The optically clear adhesive sheet of Comparative Example 3 whose thickness was smaller than the lower limit in the present invention caused delay bubbles. The optically clear adhesive sheet whose thickness was greater than the upper limit in the present invention had a haze higher than 0.5%, exhibiting insufficient transparency.

The invention claimed is:

1. An optically clear adhesive sheet comprising a cured product of a thermosetting polyurethane composition, wherein the thermosetting polyurethane composition contains a polyol component, a polyisocyanate component, a tackifier, and a catalyst,
the polyol component consists of polyols having an olefin skeleton, wherein the polyols having the olefin skeleton are the only polyol component in the thermosetting polyurethane composition, an amount of the catalyst is greater than or equal to 0.001 wt % and less than or equal to 0.1 wt % with respect to a total amount of the polyol component and the polyisocyanate component, the tackifier is a hydrogenated petroleum resin obtained by hydrogenating a copolymer of dicyclopentadiene and an aromatic compound, an amount of the tackifier is 1 wt % to 20 wt % with respect to a total amount of the thermosetting polyurethane composition, the polyols having the olefin skeleton is a polyolefin polyol obtained by hydrogenating a hydroxy group-terminated polyisoprene, both-end hydroxy group-terminated hydrogenated polybutadiene, or polyhydroxy polyolefin oligomer, a number average molecular weight of the polyol component is 500-3000, the optically clear adhesive sheet having a shear storage modulus (G') at 85° C. of $4.5 \times 10^3$ to $5.0 \times 10^4$ Pa, a loss tangent (tan δ) at 85° C. of 0.3 to 0.97, and a thickness of 50 to 2000 μm.

2. The optically clear adhesive sheet according to claim 1, which has an adhesive strength measured by a 180° peel test of 2 N/25 mm or more.

3. The optically clear adhesive sheet according to claim 1, wherein the thermosetting polyurethane composition further contains a plasticizer.

4. The optically clear adhesive sheet according to claim 3, wherein the plasticizer contains a carboxylic acid-based plasticizer.

5. A method for producing the optically clear adhesive sheet according to claim 1, the method comprising the steps of:

preparing the thermosetting polyurethane composition by mixing the polyol component, the polyisocyanate component, the tackifier, and the catalyst with stirring; and curing the thermosetting polyurethane composition.

6. A laminate comprising:

the optically clear adhesive sheet according to claim 1;

a first release liner covering one surface of the optically clear adhesive sheet; and a second release liner covering the other surface of the optically clear adhesive sheet.

7. A display device with a touchscreen, comprising:

the optically clear adhesive sheet according to claim 1;

a display panel; and a touchscreen.

* * * * *